United States Patent
Mathey et al.

(10) Patent No.: US 11,680,516 B2
(45) Date of Patent: Jun. 20, 2023

(54) MULTI-STAGE TURBOCHARGING ASSEMBLY

(71) Applicant: Turbo Systems Switzerland Ltd, Baden (CH)

(72) Inventors: Christoph Mathey, Fislisbach (CH); Andreas Strebel, Freienwil (CH)

(73) Assignee: Turbo Systems Switzerland Ltd., Baden (CH)

( * ) Notice: Subject to any disclaimer, the term of this patent is extended or adjusted under 35 U.S.C. 154(b) by 0 days.

(21) Appl. No.: 17/633,948

(22) PCT Filed: Aug. 19, 2019

(86) PCT No.: PCT/EP2019/072093
§ 371 (c)(1),
(2) Date: Feb. 8, 2022

(87) PCT Pub. No.: WO2021/032273
PCT Pub. Date: Feb. 25, 2021

(65) Prior Publication Data
US 2022/0298960 A1 Sep. 22, 2022

(51) Int. Cl.
*F02B 37/013* (2006.01)
*F01D 25/26* (2006.01)

(52) U.S. Cl.
CPC .......... *F02B 37/013* (2013.01); *F01D 25/26* (2013.01); *F05D 2220/40* (2013.01)

(58) Field of Classification Search
CPC .......... F01D 25/12; F01D 25/24; F01D 25/26; F01D 25/28; F02B 37/013; F02B 39/00; F02B 39/005; F05D 2220/40; Y02T 10/12
See application file for complete search history.

(56) References Cited

U.S. PATENT DOCUMENTS 4,196,593 A * 4/1980 Froeliger .............. F02B 37/013
  417/409
9,057,319 B2 * 6/2015 Joergl .................... F01D 25/125
(Continued)

FOREIGN PATENT DOCUMENTS

DE 19822874 A1 * 11/1999 .............. F02B 37/00
DE 102010013702 A1 10/2011
(Continued)

OTHER PUBLICATIONS

International Search Report and Written Opinion dated Jul. 3, 2020, from International Application No. PCT/EP2019/072093, 18 pages.
(Continued)

*Primary Examiner* — Jesse S Bogue
(74) *Attorney, Agent, or Firm* — Meunier Carlin & Curfman LLC

(57) ABSTRACT

A multi-stage turbocharging assembly is described. The multi-stage turbocharging assembly includes a high-pressure stage including a high-pressure turbine coupled with a high-pressure compressor. Additionally, the multi-stage turbocharging assembly includes a low-pressure stage including a low-pressure turbine coupled with a low-pressure compressor: Further, the multi-stage turbocharging assembly includes a casing enclosing the high-pressure stage and the low-pressure stage, wherein the casing is a single unit.

15 Claims, 6 Drawing Sheets

(56) References Cited

U.S. PATENT DOCUMENTS

2018/0045101 A1* 2/2018 Turner ................. F02B 37/007
2021/0310404 A1* 10/2021 Uchibori ................ F02B 37/00

FOREIGN PATENT DOCUMENTS

| DE | 102010041066 A1 | 3/2012 | | |
|----|-----------------|--------|---|---|
| DE | 102014207461 A1 | 10/2015 | | |
| DE | 102016002814 A1 | 9/2016 | | |
| DE | 102017216232 A1 | 3/2019 | | |
| EP | 2644863 A1 | 10/2013 | | |
| EP | 3848560 A1 * | 7/2021 | ............. | F01D 25/24 |
| WO | 2011008411 A2 | 1/2011 | | |
| WO | 2012098175 A1 | 7/2012 | | |

OTHER PUBLICATIONS

International Preliminary Report on Patentability dated Jan. 21, 2022, from International Application No. PCT/EP2019/072093, 9 pages.

* cited by examiner

MULTI-STAGE TURBOCHARGING ASSEMBLY

CROSS-REFERENCE TO RELATED APPLICATIONS

This application is a United States National Phase Patent Application of International Patent Application Number PCT/EP2019/072093, filed on Aug. 19, 2019, which is incorporated by reference herein in its entirety.

TECHNICAL FIELD

Embodiments of the present disclosure relate to multi-stage turbocharging assemblies. In particular, embodiments of the present disclosure relate to multi-stage turbocharging assemblies having one or more high-pressure stages and one or more low-pressure stages, particularly configured for axial flow.

BACKGROUND

Multi-stage turbochargers comprise of separate unit turbocharger assemblies interconnected to each other and to an engine charge-air path (e.g. through an intercooler and a charge air cooler). The turbine housings are connected by exhaust piping which allows the flowing of hot gasses: directing engine exhaust firstly to the inlet of a high-pressure turbine, then directing the flow through the outlet of high-pressure turbine to the inlet of low-pressure turbine and, finally, through the outlet path to the environment using exhaust manifolds. This type of architecture requires large assemblies' footprints (i.e. the space required for mounting of an assembled unit) on an engine installation, as well as multiple piping connections, bellows, supports, couplings, insulations and structural enhancement brackets aimed at reducing piping vibrations and preventing failure modes. Further, such an arrangement is of considerable complexity in terms of components assemblies, bill of materials, and service. On onboard engine assemblies, where spacing is of prime values, efforts to reduce the overall footprints of multi-stage turbocharges are made. Also, due to the general high temperature of the turbine casings and their relative connecting pipes, bulky heat shields and insulations are used.

Accordingly, in view of the above, there is a demand for improved multi-stage turbocharging assemblies which at least partially overcome the problems of the state of the art.

SUMMARY

In light of the above, a multi-stage turbocharging assembly according to independent claim 1 is provided. Further, a method for moving at least a first rotor block and a second rotor block of an exhaust turbine assembly according to claim 21 is provided. Further aspects, advantages, and features are apparent from the dependent claims, the description, and the accompanying drawings.

According to an aspect of the present disclosure, a multi-stage turbocharging assembly is provided. The multi-stage turbocharging assembly includes a high-pressure stage, particularly at least one high-pressure stage, including a high-pressure turbine coupled with a high-pressure compressor. Additionally, the multi-stage turbocharging assembly includes a low-pressure stage, particularly at least one low-pressure stage, including a low-pressure turbine coupled with a low-pressure compressor. Further, the multi-stage turbocharging assembly includes a casing enclosing the high-pressure stage, particularly at least one high-pressure stage, and the low-pressure stage, particularly at least one low-pressure stage. The casing is a single unit.

Accordingly, compared to the state of the art, an improved multi-stage turbocharging assembly is provided. In particular, embodiments of the present disclosure beneficially provide for a reduced engine footprint by integrating the housing of the different stages into a single unit. A further advantage is that assembly costs can be reduced by reducing the number of parts, i.e. by removing interconnection between the different turbine stages. Further, embodiments of the multi-stage turbocharging assembly as described herein are beneficially configured such that the exhaust piping connecting the different stages turbines can be eliminated. Accordingly, gas flow performance and efficiency can be improved. Moreover, providing a multi-stage turbocharging assembly casing being a single unit provides for the possibility of incorporating a continuous cooling system into the casing, e.g. by providing a double walled casing with an intermediate space for providing a coolant jacket. Thus, compared to the state of the art, with the embodiments of the present disclosure additional heat shielding for shielding heat from the casing during operation of the multi-stage turbocharging assembly can be reduced or even eliminated. Yet further, embodiments described herein provide for a simplification of charger air ducts to the engine charge air cooler unit. A further advantage is the possibility of modularization, such that requirements of an engine platform with multiple configurations can be fulfilled. Additionally, embodiments of the present disclosure beneficially provide for a control of clearances as well as a control of flow between high-pressure and low-pressure stages, particularly between high-pressure turbines and low-pressure turbines and/or between high-pressure compressors and low-pressure compressors.

According to a further aspect of the present disclosure, a method for moving at least a first rotor block and a second rotor block of an exhaust turbine assembly is provided. The exhaust turbine assembly has a casing, with each of the first and second rotor blocks being arranged in the casing with their axes being aligned in parallel and defining an axial direction. The casing is a single unit. The method comprises: attaching the first and second rotor blocks to a (rigid) fastening member; and moving (e.g., pulling) the first and second rotor blocks simultaneously at least partially out of the housing along the axial direction, while the first and second rotor blocks are attached to the fastening member. In particular, moving at least the first rotor block and the second rotor block of the exhaust turbine assembly can be understood as assembling or disassembling.

Accordingly, by enabling to move the first and second rotor blocks simultaneously at least partially out of the housing, controlled yet fast removal (or partial removal) of the first and second rotor blocks is enabled.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
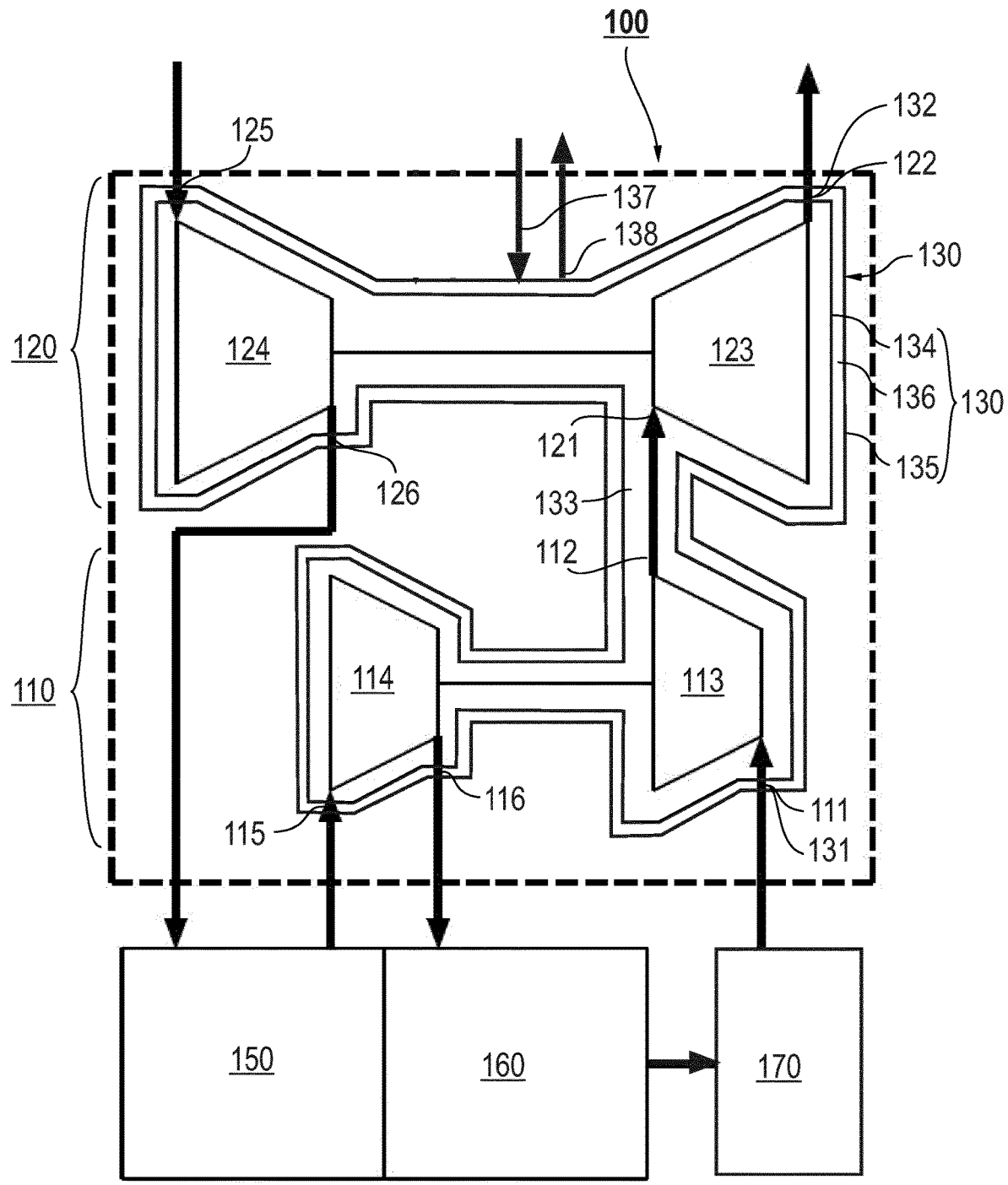
FIG. 1 shows a schematic view of a multi-stage turbocharging assembly according to embodiments described herein.

With exemplary reference to FIG. 1, a multi-stage turbocharging assembly 100 according to the present disclosure is described. According to embodiments, which can be combined with other embodiments described herein, the multi-stage turbocharging assembly 100 includes a high-pressure stage 110 including a high-pressure turbine 113 coupled, particularly mechanically coupled, with a high-pressure compressor 114. Additionally, the multi-stage turbocharging assembly 100 includes a low-pressure stage 120 including a low-pressure turbine 123 coupled, particularly mechanically coupled, with a low-pressure compressor 124. Further, the multi-stage turbocharging assembly 100 includes a casing 130 enclosing the high-pressure stage 110 and the low-pressure stage 120. The casing 130 is a single unit. In particular, the casing 130 integrates the housing of the high-pressure stage 110 and the low-pressure stage 120. In other words, the casing 130 may be an integrated single unit.

It is to be understood that the multi-stage turbocharging assembly 100 may include one or more high-pressure stages 110 and/or one or more low-pressure stages 120, as described herein. Accordingly, the casing 130 as described herein may enclose the one or more high-pressure stages 110 and the one or more low-pressure stages 120.

Accordingly, compared to the state of the art, an improved multi-stage turbocharging assembly is provided. In particular, embodiments of the present disclosure beneficially provide for a reduced engine footprint by integrating the housing of the different stages into a single unit. A further advantage is that the assembly costs can be reduced by reducing the number of parts, i.e. by removing interconnection between the different turbine stages. Further, the multi-stage turbocharging assembly is beneficially configured such that the exhaust piping connecting the one or more high-pressure stages with the one or more low-pressure stages can be eliminated. Accordingly, gas flow performance and efficiency can be improved.

Moreover, providing a multi-stage turbocharging assembly casing being a single unit provides for the possibility of incorporating a continuous cooling system into the casing, e.g. by providing a double walled casing with an intermediate space for providing a coolant jacket, as described herein. Thus, compared to the state of the art, with the embodiments of the present disclosure additional heat shielding for shielding heat from the casing during operation of the multi-stage turbocharging assembly can be reduced or even eliminated.

Additionally, embodiments of the multi-stage turbocharging assembly of the present disclosure provide for a simplification of charger air ducts to the engine charge air cooler unit. A further advantage is the possibility of modularization, such that requirements of an engine platform with multiple configurations can be fulfilled. Yet further, embodiments of the present disclosure beneficially provide for a control of clearances as well as a control of flow between high-pressure and low-pressure stages, particularly between high-pressure turbines and low-pressure turbines and/or between high-pressure compressors and low-pressure compressors.

With exemplary reference to FIG. 1, according to embodiments, which can be combined with other embodiments described herein, the casing 130 includes a passage 133 between a high-pressure turbine outlet 112 of the high-pressure turbine 113 and a low-pressure turbine inlet 121 of the low-pressure turbine 123. In particular, the passage 133 is a flow optimized passage, i.e. optimized with respect to the flow from the high-pressure turbine outlet 112 of the high-pressure turbine 113 to the low-pressure turbine inlet 121 of the low-pressure turbine 123. Accordingly, beneficially exhaust piping connecting the different stages can be eliminated such that gas flow performance and efficiency can be improved.

As described herein, the low-pressure turbine 123 can be a reversed flow axial low-pressure turbine. Typically, the low-pressure turbine 123 allows for collecting the exhaust gas post high-pressure stage within the turbine casing and directing the exhaust gas internally through the casing, e.g. via an internally mounted nozzle ring.

According to embodiments, which can be combined with other embodiments described herein, the casing 130 includes an exhaust gas inlet 131 for providing exhaust gas from an engine 170 towards the high-pressure turbine 113 inside the casing 130. In particular, the exhaust gas inlet 131 is a high-pressure turbine inlet 111, as exemplarily shown in FIGS. 1 and 2.

Figure 2:
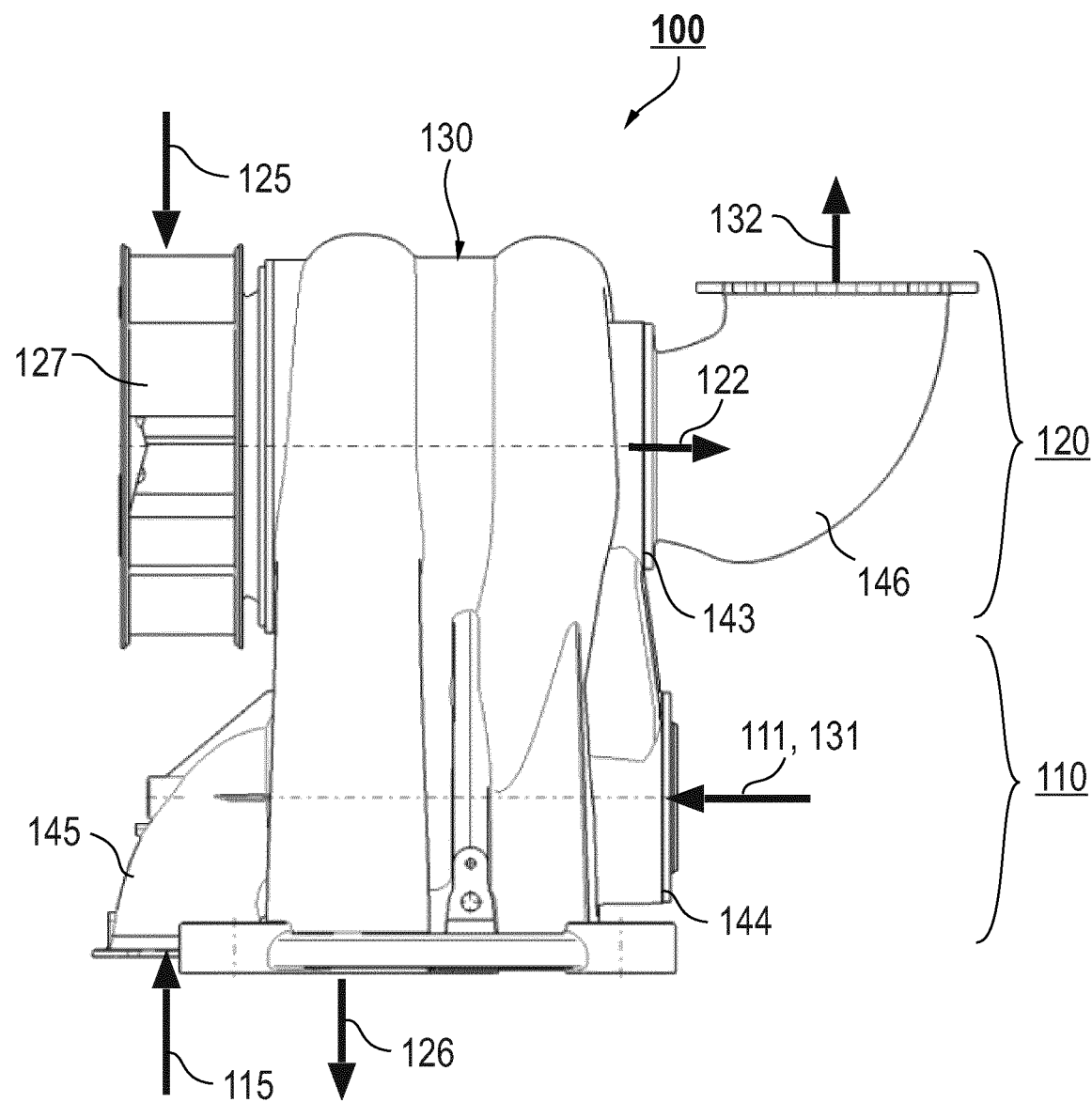
FIG. 2 shows a schematic side view of a multi-stage turbocharging assembly according to embodiments described herein.
Figure 3A:
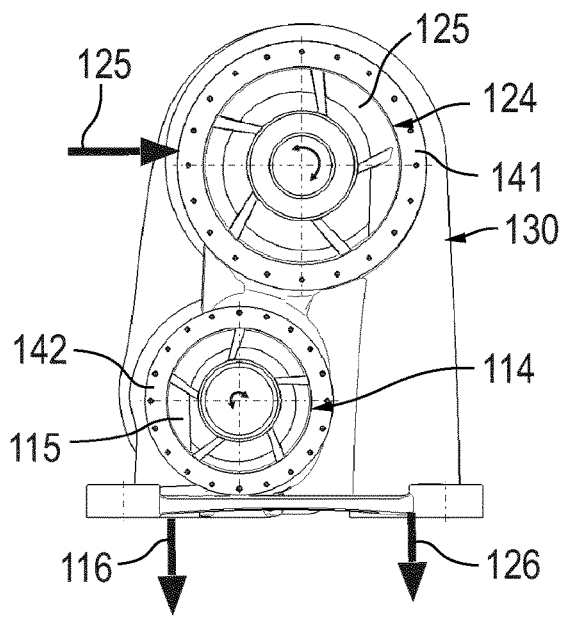
FIGS. 3A and 3B show schematic front views from an air inlet side of a multi-stage turbocharging assembly according to embodiments described herein.
Figure 3B:
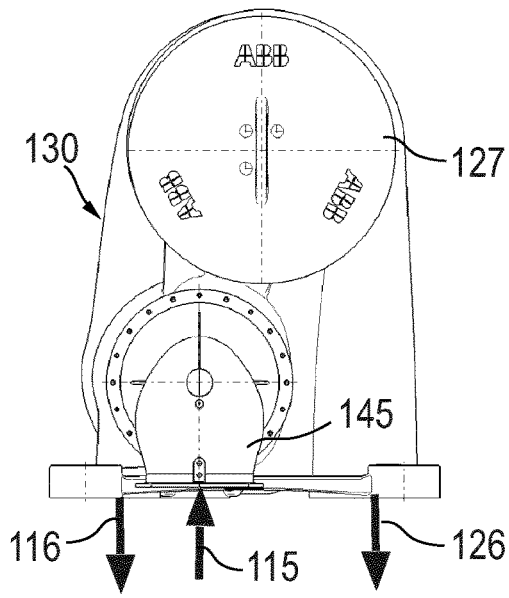
Figure 4:
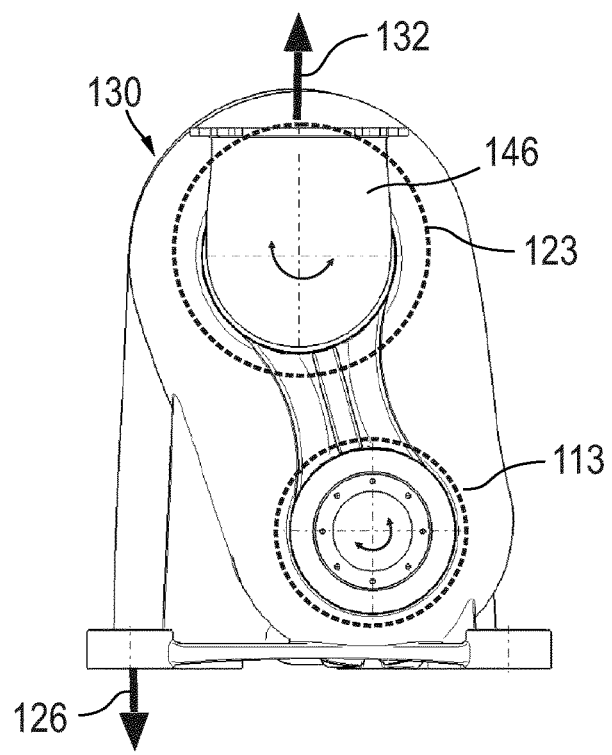
FIG. 4 shows a schematic front view from an exhaust gas in/outlet side of a multi-stage turbocharging assembly according to embodiments described herein.

According to embodiments, which can be combined with other embodiments described herein, the casing 130 includes an exhaust gas outlet 132 for providing exhaust gas from the low-pressure turbine 123 to the outside of the casing 130, as exemplarily shown in FIGS. 1 and 2. In particular, the exhaust gas outlet 132 is a low-pressure turbine outlet 122.

According to embodiments, which can be combined with other embodiments described herein, the casing 130 includes an inner casing 134 and an outer casing 135. Between the inner casing 134 and the outer casing 135, an intermediate space 136 is provided. The intermediate space 136 is configured for providing a coolant. For instance, the coolant can be water or any other suitable coolant. In particular, the intermediate space 136 can be a continuous space provided around the high-pressure stage 110 and the low-pressure stage 120.

Typically, the inner casing 134 is an integrated single unit. Accordingly, the outer casing 135 may be an integrated single unit. It is to be understood, that features described herein with respect to the casing 130 may also apply to the inner casing 134 and/or the outer casing 135.

According to embodiments, which can be combined with other embodiments described herein, the casing 130 includes a coolant inlet 137 for providing coolant into the intermediate space 136. Additionally, the casing 130 includes a coolant outlet 138 for removing coolant from the intermediate space 136. Accordingly, it is to be understood that the casing may include an integrated cooling space and one or more integrated cooling channels for providing the coolant.

Accordingly, it is to be understood that embodiments of the present disclosure beneficially provide for eliminating and reducing heat shielding from hot casings by incorporating an internal coolant jacket into the casing. Thus, beneficially compressors, turbines and bearing housings can be actively cooled.

Accordingly, it is to be understood that the casing, particularly the turbine casings, can beneficially be cooled around the main hot critical areas of the internal gas passage connecting the turbines. This allows for a reduced outer wall casing skin temperature and a reduction of external thermal insulation. Coolant can be provided by a separate cooling system or directly supplied from the engine intercooler onto which the assembly is mounted. Thus, beneficially the casing requires no additional piping for cooling.

According to embodiments, which can be combined with other embodiments described herein, the casing 130 is a single piece structure, particularly an integrated single piece structure of casted material. For instance, the casted material can be an aluminum alloy. Further it is to be understood that the casing may be made of other materials such as steel casting, grey cast iron, or other suitable casting materials. According to an example, the casing as described herein is a single casted casing, particularly an ALFIN casing, for housing both the high-pressure and low-pressure stages.

According to embodiments, which can be combined with other embodiments described herein, the rotational axis of the high-pressure stage and the rotational axis of the low-pressure stage are parallel to each other and define an axial direction. According to embodiments, which can be combined with other embodiments described herein, the high-pressure stage 110 is arranged below the low-pressure stage 120. Alternatively, the low-pressure stage 120 is arranged below the high-pressure stage 110. In this regard, it is to be understood that the rotational axis of the high-pressure stage and the rotational axis of the low-pressure stage may be in the same vertical plane or in different vertical planes. In other words, the rotational axis of the high-pressure stage and the rotational axis of the low-pressure stage may be laterally displaced with respect to each other. In particular, the rotational axis of the high-pressure stage 110 may be laterally displaced with respect to the rotational axis of the low-pressure stage 12, or vice versa, when seen from the top of the multistage turbocharging assembly 100.

It is to be understood that on the compressor side, the arrangement of the low-pressure compressor and the high-pressure compressor are related to the arrangement of the low-pressure turbine and the high-pressure turbine. In other words, on the compressor side, the mounting of the low stage compressor above the high stage compressor (related to the turbine placement) allows for incorporating into the casing wider air passages.

According to embodiments, which can be combined with other embodiments described herein, the high-pressure stage 110 is configured to have an inversed rotational direction compared to a rotational direction of the low-pressure stage 120 during operation of the multi-stage turbocharging assembly. Alternatively, the high-pressure stage 110 may be configured to have the same rotational direction as the low-pressure stage 120 during operation of the multi-stage stage turbocharging assembly.

According to embodiments, which can be combined with other embodiments described herein, the casing 130 includes a first flange 141 for connecting a silencer 127, an inlet casing, or an inlet pipe to a low-pressure compressor inlet 125.

According to embodiments, which can be combined with other embodiments described herein, the casing 130 includes a second flange 142 for connecting an inlet casing or inlet pipe, particularly an elbow-inlet casing or elbow-inlet pipe 145, to a high-pressure compressor inlet 115 of the casing 130.

According to embodiments, which can be combined with other embodiments described herein, the casing 130 includes a third flange 143 for connecting an outlet casing or outlet pipe, particularly an elbow-outlet casing or an elbow-outlet pipe 146, to a low-pressure turbine outlet 122.

According to embodiments, which can be combined with other embodiments described herein, the casing 130 includes a fourth flange 144 for connecting an inlet casing or inlet pipe 146, to a high-pressure turbine inlet 111.

According to embodiments, which can be combined with other embodiments described herein, the casing 130 includes a low-pressure compressor outlet 126. In particular, the low-pressure compressor outlet 126 is configured for providing low-pressure air to an intercooler 150.

According to embodiments, which can be combined with other embodiments described herein, the casing 130 includes a high-pressure compressor outlet 116. In particular, the high-pressure compressor outlet 116 is configured for providing high-pressure air to a charge air cooler 160.

Figure 5:
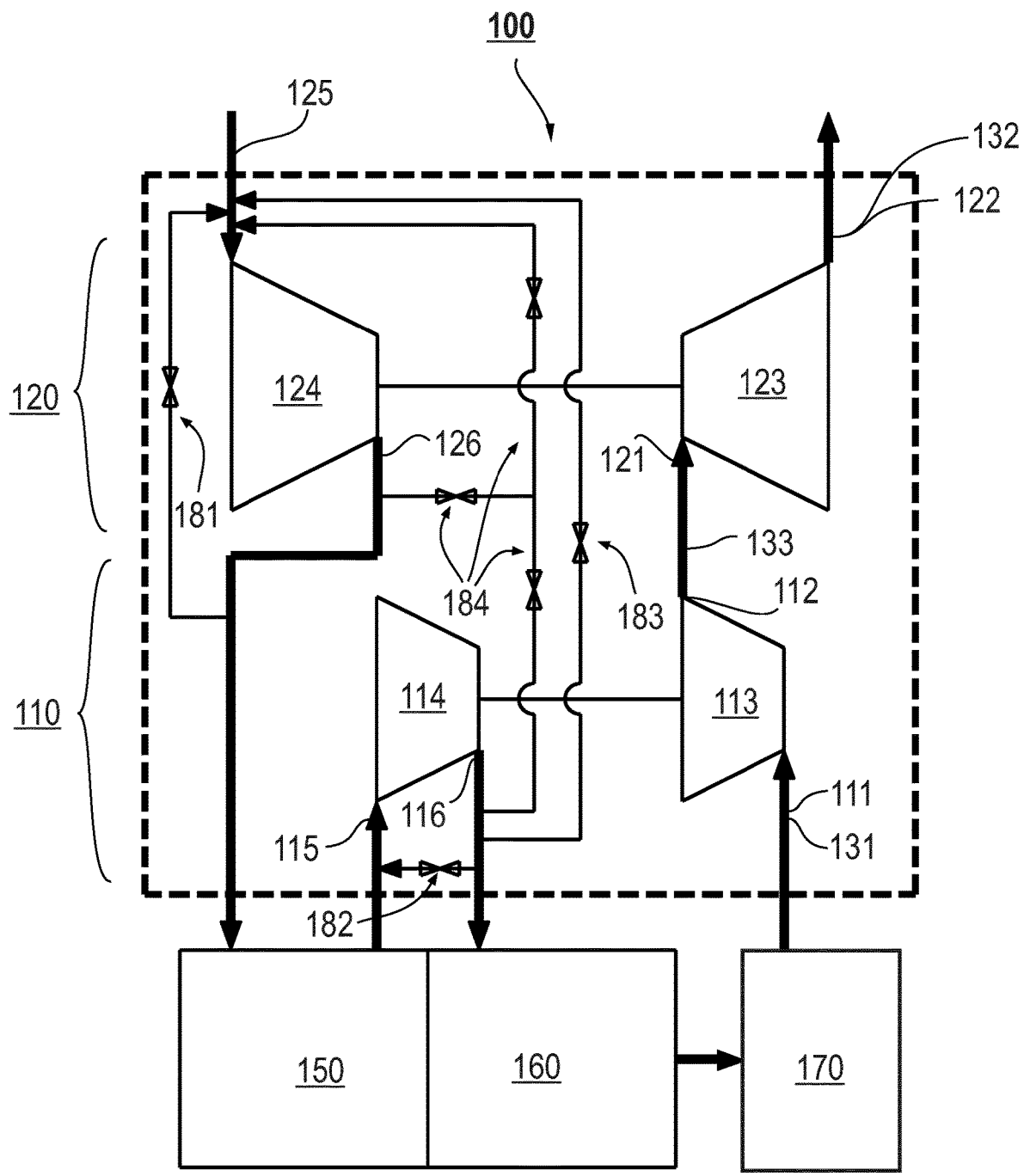
FIG. 5 shows a schematic view of a multi-stage turbocharging assembly having an air wastegate according to embodiments described herein.

With exemplary reference to FIG. 5, a multi-stage turbocharging assembly having an air wastegate is described. In particular, FIG. 5 shows a schematic illustration of possible air wastegate configurations. According to embodiments, which can be combined with other embodiments described herein, the casing of the multi-stage turbocharging assembly can include an air wastegate for providing a device for limiting the charge air pressure. In particular, the casing of the multi-stage turbocharging assembly may include at least one air wastegate selected from the group consisting of a low-pressure air wastegate 181, a high-pressure air wastegate 182, a multi-stage air wastegate 183, and a variable air wastegate 184.

According to embodiments, which can be combined with other embodiments described herein, the low-pressure air wastegate 181 provides a flow passage for the air from the low-pressure compressor outlet 126 to the low-pressure compressor inlet 125, as exemplarily shown in FIG. 5.

According to embodiments, which can be combined with other embodiments described herein, the high-pressure air wastegate 182 provides a flow passage for the air from high-pressure compressor outlet 116 to the high-pressure compressor inlet 115, as exemplarily shown in FIG. 5.

According to embodiments, which can be combined with other embodiments described herein, the multi-stage air wastegate 183 provides a flow passage for the air from the high-pressure compressor outlet 116 to the low-pressure compressor inlet 125, as exemplarily shown in FIG. 5.

According to embodiments, which can be combined with other embodiments described herein, the variable air wastegate 184 provides a flow passage for the air from the high-pressure compressor outlet 116 to the low-pressure compressor inlet 125 and/or to the low-pressure compressor outlet 126 or from the low-pressure compressor outlet 126 to the low-pressure compressor inlet 125, as exemplarily shown in FIG. 5. In particular, the variable air wastegate 184 may be configured to be controllable such that the flow passage for the air from the high-pressure compressor outlet 116 to the low-pressure compressor inlet 125 and/or to the low-pressure compressor outlet 126 or from the low-pressure compressor outlet 126 to the low-pressure compressor inlet 125 can be selected.

Figure 6:
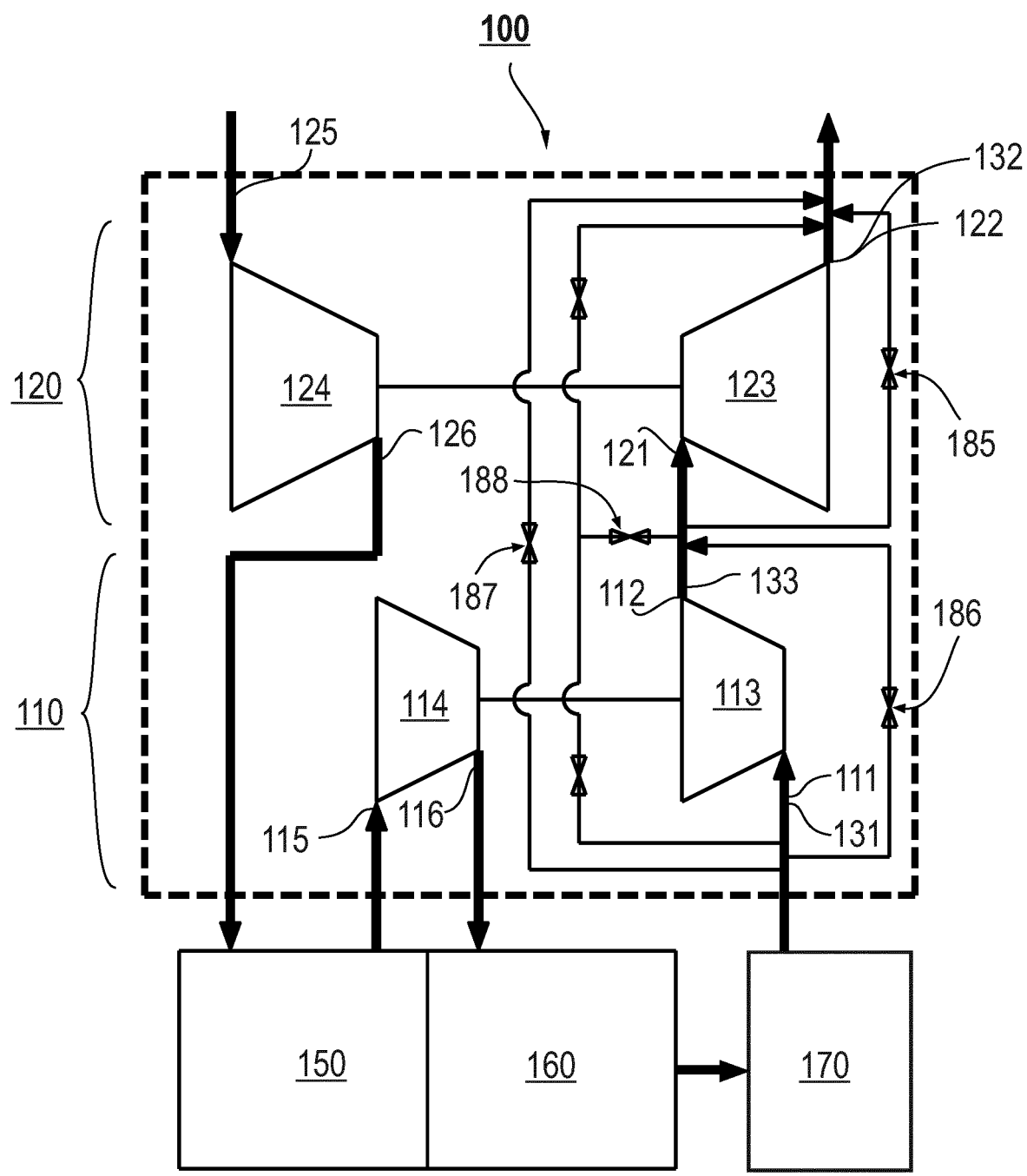
FIG. 6 shows a schematic view of a multi-stage turbocharging assembly having an exhaust gas wastegate according to embodiments described herein.

With exemplary reference to FIG. 6, a multi-stage turbocharging assembly having an exhaust gas wastegate is described. According to embodiments, which can be combined with other embodiments described herein, the casing of the multi-stage turbocharging assembly includes an exhaust gas wastegate for providing a device for limiting the charge air pressure. In particular, the casing of the multi-stage turbocharging assembly may include at least one selected from the group consisting of a low-pressure exhaust gas wastegate 185, a high-pressure exhaust gas wastegate 186, a multi-stage exhaust gas wastegate 187, and a variable exhaust gas wastegate 188.

According to embodiments, which can be combined with other embodiments described herein, the low-pressure exhaust gas wastegate 185 provides a flow passage for the exhaust gas from the high-pressure turbine outlet 112 before the low-pressure turbine inlet 121 to the low-pressure turbine outlet 122 or the exhaust gas outlet 132. In particular, the low-pressure exhaust gas wastegate 185 may be connected to the passage 133 between the high-pressure turbine 113 and the low-pressure turbine 123, as exemplarily shown in FIG. 6.

According to embodiments, which can be combined with other embodiments described herein, the high-pressure exhaust gas wastegate 186 provides a flow passage for the exhaust gas from the engine 170 before the high-pressure turbine inlet 111 to the high-pressure turbine outlet 112 or the low-pressure turbine inlet 121. In particular, the high-pressure exhaust gas wastegate 186 may be connected to the passage 133 between the high-pressure turbine 113 and the low-pressure turbine 123, as exemplarily shown in FIG. 6.

According to embodiments, which can be combined with other embodiments described herein, the multi-stage exhaust gas wastegate 187 provides a flow passage for the exhaust gas from the engine 170 before the high-pressure turbine inlet 111 to the low-pressure turbine outlet 122 or the exhaust gas outlet 132, as exemplarily shown in FIG. 6.

According to embodiments, which can be combined with other embodiments described herein, the variable exhaust gas wastegate 188 provides a flow passage for the exhaust gas from the engine 170 before the high-pressure turbine inlet 111 to the high-pressure turbine outlet 112 (or the low-pressure turbine inlet 121) and/or to the low-pressure turbine outlet 122 (or the exhaust gas outlet 132) or from the high-pressure turbine outlet 112 (or the low-pressure turbine inlet 121) to the low-pressure turbine outlet 122 (or the exhaust gas outlet 132). In particular, the variable exhaust gas wastegate 188 may be connected to the passage 133 between the high-pressure turbine 113 and the low-pressure turbine 123. Further, the variable exhaust gas wastegate 188 may be configured to be controllable such that the flow passage for the exhaust gas from the engine 170 before the high-pressure turbine inlet 111 to the high-pressure turbine outlet 112 (or the low-pressure turbine inlet 121) and/or to the low-pressure turbine outlet 122 (or the exhaust gas outlet 132) or from the high-pressure turbine outlet 112 (or the low-pressure turbine inlet 121) to the low-pressure turbine outlet 122 (or the exhaust gas outlet 132) can be selected.

Figure 7:
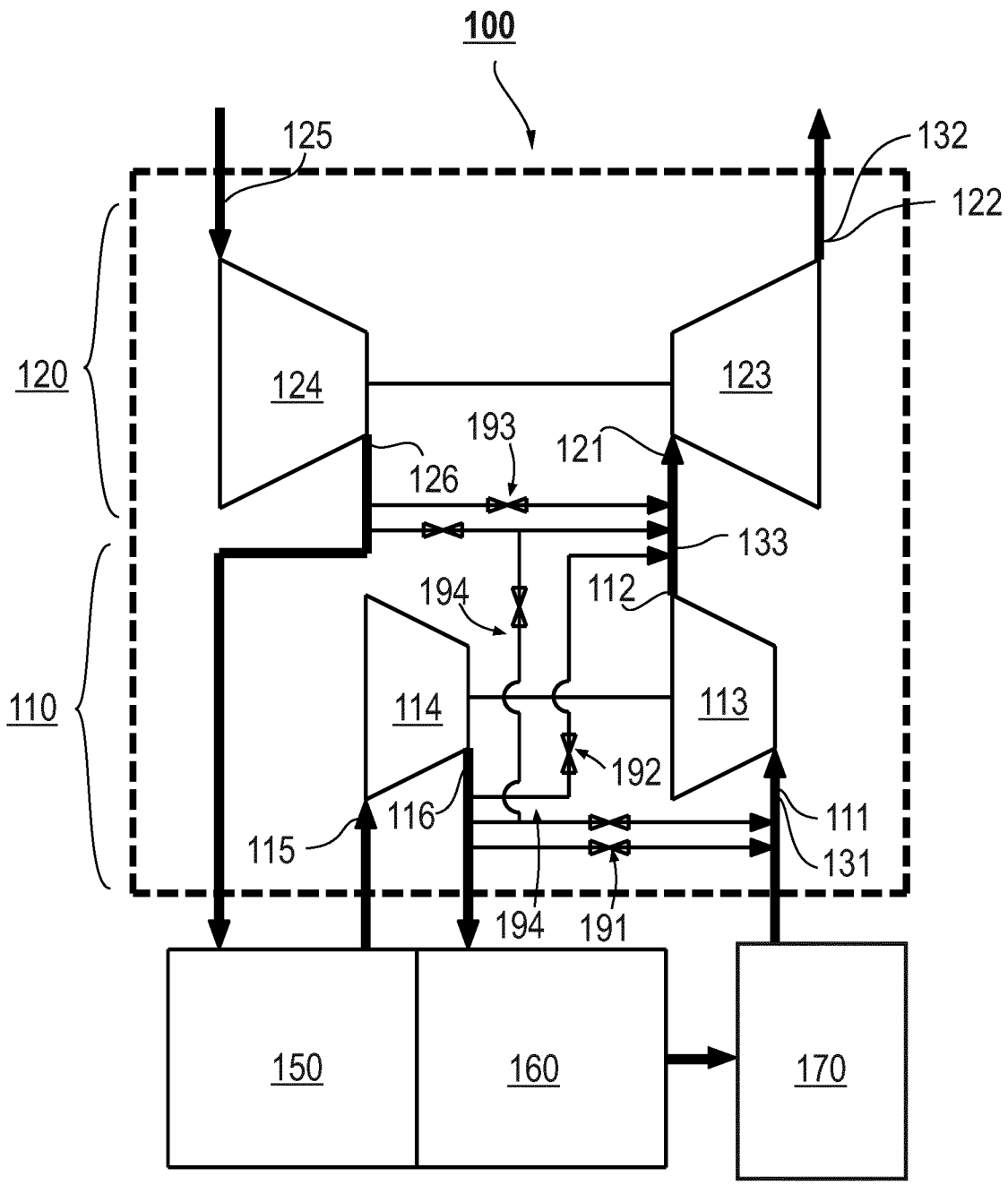
FIG. 7 shows a schematic view of a multi-stage turbocharging assembly having a by-pass system according to embodiments described herein.

With exemplary reference to FIG. 7, a multi-stage turbocharging assembly having a by-pass system is described. According to embodiments, which can be combined with other embodiments described herein, the casing of the multi-stage turbocharging assembly includes a by-pass system for providing a device to change the operating point in the compressor map. In particular, the casing of the multi-stage turbocharging assembly may include at least one selected from the group consisting of a first by-pass 191, a second by-pass 192, a third by-pass 193 and a fourth by-pass 194.

According to embodiments, which can be combined with other embodiments described herein, the first by-pass 191 provides a flow passage for the air from the high-pressure compressor outlet 116 to the high-pressure turbine inlet 111, as exemplarily shown in FIG. 7.

According to embodiments, which can be combined with other embodiments described herein, the second by-pass 192 provides a flow passage for the air from the high-pressure compressor outlet 116 to the high-pressure turbine outlet 112 before the low-pressure turbine inlet 121. In particular, the second by-pass 192 may be connected to the passage 133 between the high-pressure turbine 113 and the low-pressure turbine 123, as exemplarily shown in FIG. 7.

According to embodiments, which can be combined with other embodiments described herein, the third by-pass 193 provides a flow passage for the air from the low-pressure compressor outlet 126 to the high-pressure turbine outlet 112 before the low-pressure turbine inlet 121. In particular, the third by-pass 193 may be connected to the passage 133 between the high-pressure turbine 113 and the low-pressure turbine 123, as exemplarily shown in FIG. 7.

According to embodiments, which can be combined with other embodiments described herein, the fourth by-pass 194 is a variable bypass providing a flow passage from the high-pressure compressor outlet 116 to the high-pressure turbine inlet 111 and/or the high-pressure turbine outlet 112 before the low-pressure turbine inlet 121 or from the low-pressure compressor outlet 126 to the high-pressure turbine outlet 112 before the low-pressure turbine inlet 121. In particular, the fourth by-pass 194 may be configured to be controllable such that the flow passage from the high-pressure compressor outlet 116 to the high-pressure turbine inlet 111 and/or the high-pressure turbine outlet 112 before the low-pressure turbine inlet 121 or from the low-pressure compressor outlet 126 to the high-pressure turbine outlet 112 before the low-pressure turbine inlet 121 can be selected.

Although not explicitly shown in the figures, it is to be understood that according to embodiments, which can be combined with other embodiments described herein, the casing 130 may include elements which assure the containment safety. In particular, the containment safety can be assured by inserts of different material inside the casting. Alternatively, the containment safety can be assured by providing inlays into the cooling channels.

Further, it is to be understood that according to embodiments, which can be combined with other embodiments described herein, the casing 130 typically includes surfaces that are in contact with air and/or exhaust gas. Said surfaces are typically treated or designed in such a way, that the casing is made out of at least two different materials. In particular, such a surface treatment can be provided by applying at least one of anodizing, chrome plating, applying Nikasil, etc. The combination of different materials could, for example, be provided by a casted channel structure, directly bounded to the outside structure material, e. g. using a composite casting process, e.g. an ALFIN process.

In view of the embodiments of the present disclosure, it is to be understood that housing integration provides for several advantages. In particular, the multi-stage turbocharging assembly may include a single casted composite casing, e.g. an ALFIN, for housing both one or more high-pressure stages and one or more low-pressure stages. According to an example, the one or more high-pressure stages can be arranged in a lower section of the casing and the one or more low-pressure stages can be arranged above the one or more high-pressure stages. Such an arrangement allows for a direct connection to the exhaust gasses of an engine. Further, beneficially spacing between stages is minimized by clocking the one or more low-pressure stages from the vertical position.

Further, it is to be understood that integration of the different stages housings, particularly the turbines housings and the compressors housings, into a single component, particularly with internal cavities for coolant passage, allows for direct transfer of exhaust gases from the high-pressure turbine to the low-pressure turbine without the use of extra external piping, joints and efficiencies losses associated to pipe elbowing. Further, it is to be understood, that embodiments as described herein provide for the advantage that two or more separate turbines can be spaced in such a way to optimize the exhaust gasses flow, which is directed through an internal passage created via the single casing. This allows for the removal of connecting pipes within the different turbine stages, and the reverse flow axial turbine allows for the hot gasses to flow through the different stages with minimal disturbance to the natural flow of gasses.

Additionally, with the integration of the housing for a multi-stage turbocharger an improved design can be provided with which the overall installation footprint can be reduced. More specifically, a setup of the low-pressure turbine being mounted vertically above the high-pressure turbine allows for a general reduction in mounting footprint of the turbocharger assembly. Accordingly, the reduction in footprint is compensated in increased overall height of the assembly.

Hence, compared to the state of the art, the embodiments described herein provide for an improved multi-stage turbocharging assembly. The multi-stage turbocharging assembly according to embodiments described herein can be implemented on turbocharges, 4-strokes engines and 2-strokes engines.

Finally, a method for moving at least a first rotor block and a second rotor block of an exhaust turbine assembly is described. The method is particularly useful for (at least partially) disassembling and/or accessing the high-pressure and low-pressure stages of the multi-stage turbocharging assembly described herein. In this case, the exhaust turbine assembly referred to herein is the multi-stage turbocharging assembly, with the first and second rotor blocks referred to herein being the high-pressure and low-pressure stages of the multi-stage turbocharging assembly, respectively. The method can more generally also be applied to any other exhaust turbine assemblies having at least a first rotor block and a second rotor block, such as a two-stage turbo-generator assembly.

The general turbocharging assembly has the following characteristics:
A first rotor block and a second rotor block: The rotor blocks comprise the actual rotor with the respective turbine wheel, shaft and compressor wheel (or with the linkage to a generator in case of a turbo-generator), and may further comprise an inner bearing region. The rotor blocks can also be provided as a module with a module housing element, the module being configured for being extracted, in one piece, from the casing in an axial direction.
The exhaust turbine assembly has a (common) casing, with each of the first and second rotor blocks being arranged in the casing with their axes being aligned in parallel and defining an axial direction. The casing is a single unit. The casing typically has, for each rotor block an axial opening at one side, e.g., the compressor side, typically after removal of a turbine housing or a portion thereof. The rotor blocks can then be accessed and removed through this axial opening.

The method for moving the first and second rotor blocks comprises:
attaching the first and second rotor blocks to a (rigid) fastening member, e.g., by screws or bolts; thereby fastening the first and second rotor blocks to each other; and
moving (e.g., pulling) the first and second rotor blocks simultaneously at least partially out of the housing along the axial direction, while the first and second rotor blocks are attached to the fastening member.

In particular, attaching the first and second rotor blocks to a rigid fastening member includes attaching the rigid fastening member together with at least the first rotor block and the second rotor block of an exhaust turbine assembly, preferably of a multi-stage turbocharging assembly 100 according to embodiments described herein, to a lifting device; attaching the rigid fastening member with the first and second rotor blocks to a rigid fastening bracket; and attaching the rigid fastening bracket to the lifting device. For example, the lifting device can be any means for lifting (e.g. a crane, pulley block, etc., or more specifically a sling (e.g. a shekel, a round sling, etc.).

The method is not limited to two rotor blocks but can also be used with a third rotor block or yet further rotor blocks. In this case, the third/further rotor blocks are also attached to the fastening member and moved at least partially out of the housing simultaneously with the first and second rotor blocks.

While the foregoing is directed to embodiments, other and further embodiments may be devised without departing from the basic scope, and the scope is determined by the claims that follow.

REFERENCE NUMBERS 100 multi-stage turbocharging assembly
110 high-pressure stage
111 high-pressure turbine inlet
112 high-pressure turbine outlet
113 high-pressure turbine
114 high-pressure compressor
115 high-pressure compressor inlet
116 high-pressure compressor outlet
120 low-pressure stage
121 low-pressure turbine inlet
122 low-pressure turbine outlet
123 low-pressure turbine 124 low-pressure compressor
125 low-pressure compressor inlet
126 low-pressure compressor outlet
127 silencer
130 casing
131 exhaust gas inlet
132 exhaust gas outlet
133 passage
134 inner casing
135 outer casing
136 intermediate space
137 coolant inlet
138 coolant outlet
141 first flange
142 second flange
143 third flange
144 fourth flange
145 elbow inlet pipe
146 elbow outlet pipe
150 intercooler
160 charge air cooler
170 engine
181 low-pressure air wastegate
182 high-pressure air wastegate
183 multi-stage air wastegate
184 variable air wastegate
185 low-pressure exhaust gas wastegate
186 high-pressure exhaust gas wastegate
187 multi-stage exhaust gas wastegate
188 variable exhaust gas wastegate
191 first by-pass
192 second by-pass
193 third by-pass
194 fourth by-pass

The invention claimed is:

1. A multi-stage turbocharging assembly, comprising
a high-pressure stage comprising a high-pressure turbine coupled with a high-pressure compressor;
a low-pressure stage comprising a low-pressure turbine coupled with a low-pressure compressor; and
a casing enclosing the high-pressure stage and the low-pressure stage, wherein the casing is a single unit;
wherein the casing comprises a flow optimized passage between a high-pressure turbine outlet of the high-pressure turbine and a low-pressure turbine inlet of the low-pressure turbine.

2. The multi-stage turbocharging assembly of claim 1, wherein the casing comprises at least one of:
a first flange for connecting a silencer, an inlet casing, or an inlet pipe to a low-pressure compressor inlet,
a second flange for connecting an inlet casing or inlet pipe to a high-pressure compressor inlet of the casing,
a third flange for connecting an exhaust gas outlet for providing exhaust gas from the low-pressure turbine to the outside of the casing, and
a fourth flange for connecting an exhaust gas inlet for providing exhaust gas from an engine towards the high-pressure turbine inside the casing.

3. The multi-stage turbocharging assembly of claim 1, wherein the casing comprises an inner casing and an outer casing, wherein an intermediate space is provided between the inner casing and the outer casing, and wherein the intermediate space is configured for providing a coolant.

4. The multi-stage turbocharging assembly of claim 3, wherein the casing comprises a coolant inlet for providing coolant into the intermediate space and a coolant outlet for removing coolant from the intermediate space.

5. The multi-stage turbocharging assembly of claim 3, wherein the intermediate space is a continuous space provided around the high-pressure stage and the low-pressure stage.

6. The multi-stage turbocharging assembly of claim 1, wherein the casing is an integrated single piece structure of casted material.

7. The multi-stage turbocharging assembly of claim 1, wherein the high-pressure stage is arranged below the low-pressure stage.

8. The multi-stage turbocharging assembly of claim 1, wherein the high-pressure stage is configured to have an inversed or same rotational direction compared to a rotational direction of the low-pressure stage during operation of the multi-stage stage turbocharging assembly.

9. The multi-stage turbocharging assembly of claim 1, wherein the casing comprises at least one of:
a low-pressure compressor outlet for providing low-pressure air to an intercooler, and
a high-pressure compressor outlet for providing high-pressure air to a charge air cooler.

10. The multi-stage turbocharging assembly of claim 1, wherein the casing comprises at least one of an air-wastegate for providing a device for limiting the charge air pressure, and an exhaust gas wastegate (185, 186, 187, 188) for providing a device for limiting the charge air pressure.

11. The multi-stage turbocharging assembly of claim 1, wherein the casing comprises a by-pass system for providing a device to change the operating point in the compressor map.

12. The multi-stage turbocharging assembly of claim 1, wherein the casing provides elements which assure the containment safety.

13. The multi-stage turbocharging assembly of claim 1, wherein the casing has surfaces that are in contact with at least one of air and exhaust gas and the surfaces are at least one of treated and designed in such a way, that the casings are consisting of at least two different materials.

14. The multi-stage turbocharging assembly of claim 1, wherein the low-pressure stage is arranged below the high-pressure stage.

15. The multi-stage turbocharging assembly of claim 1, wherein the high-pressure stage is configured to have a same rotational direction compared to a rotational direction of the low-pressure stage during operation of the multi-stage turbocharging assembly.

* * * * *